July 7, 1925.
A. MESSER
DEVICE FOR KILLING BIRDS
Filed Dec. 6, 1923
1,545,156
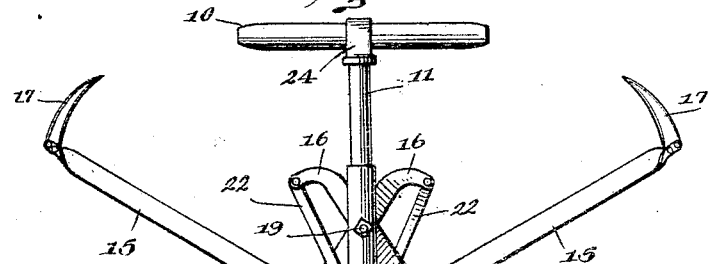
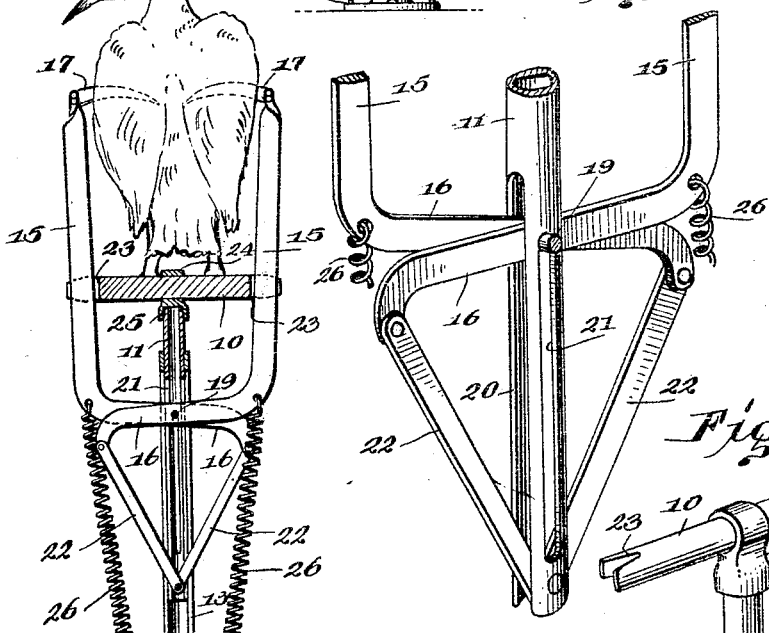
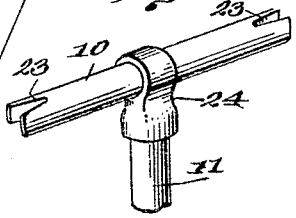
Inventor
Alfred Messer
By O'Connell & O'Connell
Attorney Patented July 7, 1925.

1,545,156

UNITED STATES PATENT OFFICE.

ALFRED MESSER, OF DETROIT, MICHIGAN.

DEVICE FOR KILLING BIRDS.

Application filed December 6, 1923. Serial No. 678,878.

*To all whom it may concern:*

Be it known that I, ALFRED MESSER, a citizen of the United States, residing at Detroit, in the county of Wayne and State of Michigan, have invented certain new and useful Improvements in a Device for Killing Birds, of which the following is a specification.

This invention is a device for killing birds and it is especially adapted for killing all feathered pests, including species of both land and water fowls whose destructive propensities are very often a source of annoyance and great expense to the State, as well as to the country at large.

It is the special object of the invention to provide for the destruction of troublesome birds in an effective and economical manner, and with this end in view it presents a device capable of operating with little or no supervision and re-setting after each operation, thereby dispensing with the need of an attendant except at appointed times when it may be deemed advisable to inspect the device or to change the location of the same.

For the accomplishment of the above stated objects, and others which may be apparent from the following description, the invention consists of the novel arrangement, construction, and combination of parts hereinafter set forth and described with reference to the accompanying drawing, wherein:

Figure 1 is an elevation of the device as set up and ready for operation.

Figure 2 is a view illustrating the relative position of the parts after the device is operated.

Figure 3 is a detailed view showing certain of the parts on an enlarged scale, and Figure 4 is a detailed view of the perch.

This device comprises a pair of knives pivoted to a supporting standard which serves as a guide for a depressible perch to which the knives are connected and upon which the bird alights, the weight of the knives normally serving to hold the perch elevated, and means being provided for resetting the device after each operation.

In the drawing, 10 designates the perch rod upon which the bird alights, the same being carried by a staff 11 which is guided in its vertical movement by the pipe 12 of the supporting standard, the latter including a deck flange 13 into which the lower end of the pipe is screwed, as shown at 14. The deck flange provides suitable means whereby the device may be fastened to the top of a pole or stake driven into the ground, as well as enabling the same to be anchored directly to the ground, if so desired. The knives of the device are similar in construction and each embodies a lever presenting relatively long and short angularly disposed arms 15 and 16 and a knife-blade 17 fastened to the end of the longer arm so as to extend approximately at a right angle to the said arm. The blades 17 are comparatively short and pointed, and are provided, also, with a keen cutting edge along either one or both sides as may be desired. The knives are disposed on opposite sides of the standard with their shorter arms 16 crossing each other as they extend thru the slot 18 in the pipe 12 and fulcrumed on a bolt or other element 19 which extends crosswise of the pipe adjacent the upper end of the latter.

The lower end of the staff 11 is bifurcated, as at 20, to provide clearance for the short arms of the levers and thus avoid any interference with the raising and lowering of the perch. Each leg of the bifurcation is, for the same reason, provided with a slot 21 to clear the fulcrum 19. Suitable links 22 connect the free terminals of the lever arms 16 to the lower end of staff 11 so that the knives will be actuated by movement of the perch. When the perch is at its highest elevation, the knives will be positioned so that the blades 17 are below and remote from the perch rod 10, as illustrated in Figure 1, and when the perch is depressed by the weight of the bird alighting thereupon the inward movement of the staff, by reason of the leverage afforded by the links 22 and the short arms 16 of the levers, causes the long arms of the levers to swing upwardly with great rapidity on each side of the perch, bringing the blades together, as illustrated in Figure 2. The height of the blades 17 above the perch rod 10 may be varied as desired, but it is preferred that they be so located as to cut through the bird rearwardly of the breast and in front of the legs. Each end of the perch rod 10 has a V-shaped notch 23 to accommodate the arms 15 of the levers and the parts of the device are relatively proportioned and adjusted so that the weight of the knives is sufficient to normally hold the perch elevated while only a light weight or pressure on the perch is sufficient to force the same down, the parts moving swiftly and comparatively noiselessly.

The device is, moreover, constructed so as to be capable of being readily taken apart for repairs, shipment, or for storage; the bolt 19 being removable to permit detaching the knives, and the perch rod 10 being detachably mounted on the staff 11 by a bracket 24 into which the upper end of the staff is screwed as shown at 25.

To assist in re-setting the device after each operation, the short arm 16 of the levers are connected to the deck flange 13 of the standard by coil springs 26. These springs are adapted to be expanded as the arms 15 move upwardly and are thus placed under tension so as to exert a downward pull on the knives sufficient to pull them back to the positions illustrated in Figure 1, after the bird is released. In the operation of the device when the bird alights upon the perch and forces it down, the blades strike the bird in the thin parts of its sides inflicting a mortal wound but at the same time leaving the bird life enough to struggle and to remove itself from the perch practically by cutting its way loose from the blades. After the bird has cut itself loose, the springs will pull the blades back and reset the device for further operation.

Although the foregoing has reference to a particular embodiment of the invention it is to be understood that the invention is not limited to the precise details of construction herein illustrated and described but that the same is susceptible of various modifications and alterations within the scope of the appended claims.

Having thus described the invention, I claim:

1. A device for killing birds including a supporting standard, a depressible perch adapted to be guided in its movement by the said standard and to be depressed by the weight of a bird alighting thereupon, knives pivotally mounted on the said standard and connected to the said perch to be actuated by the latter, said knives being adapted to be brought together above the perch when the latter is depressed and to be positioned remote from the perch when the latter is elevated, the weight of the knives normally serving to hold the perch elevated.

2. A device for killing birds including a supporting standard, a vertically reciprocable perch slidable within the said standard whereby the latter serves as a guide for the perch, said perch being adapted to be depressed by the weight of a bird alighting thereupon, knives pivotally mounted on the said standard, said knives respectively including a lever presenting relatively long and short angularly disposed arms and a knife-blade carried by the long arm, a connection between the short arms of the said levers and the said perch whereby the said levers are actuated to bring the said blades together above the perch when the latter is depressed and to position them remote from the perch when the latter is elevated, the weight of the knives normally serving to hold the perch elevated, and elastic connections between the said levers and the said standard for assisting the return of the knives to their said remote position after each operation of the device.

In testimony whereof I affix my signature.

ALFRED MESSER.